April 13, 1954     R. D. HULL     2,675,192
SPINNING-TYPE REEL
Filed April 5, 1951     2 Sheets-Sheet 2
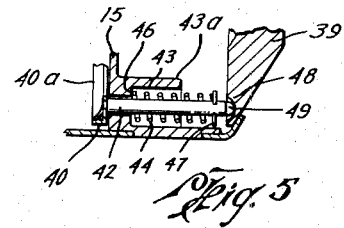
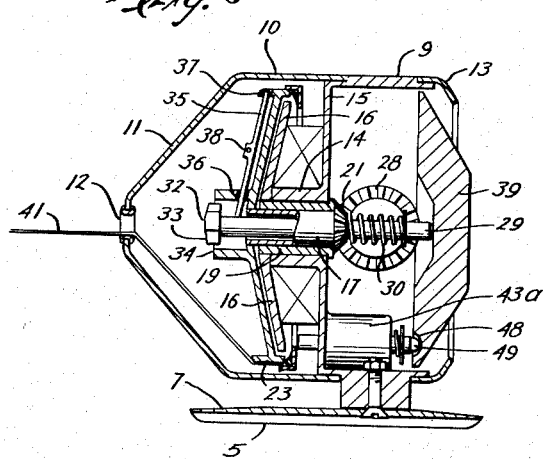
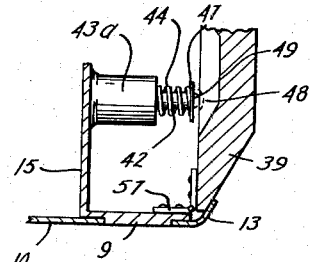
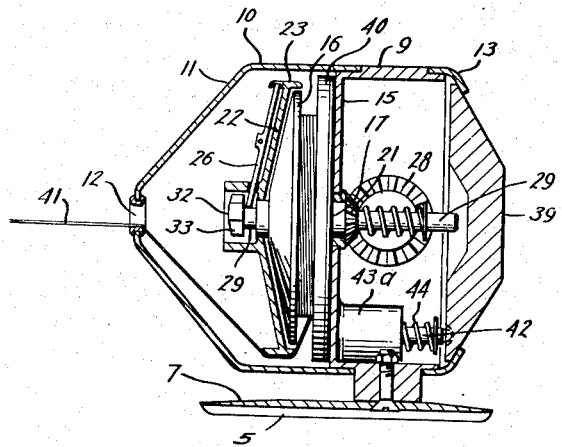
R. Dell Hull
INVENTOR.
BY
ATTORNEY Patented Apr. 13, 1954

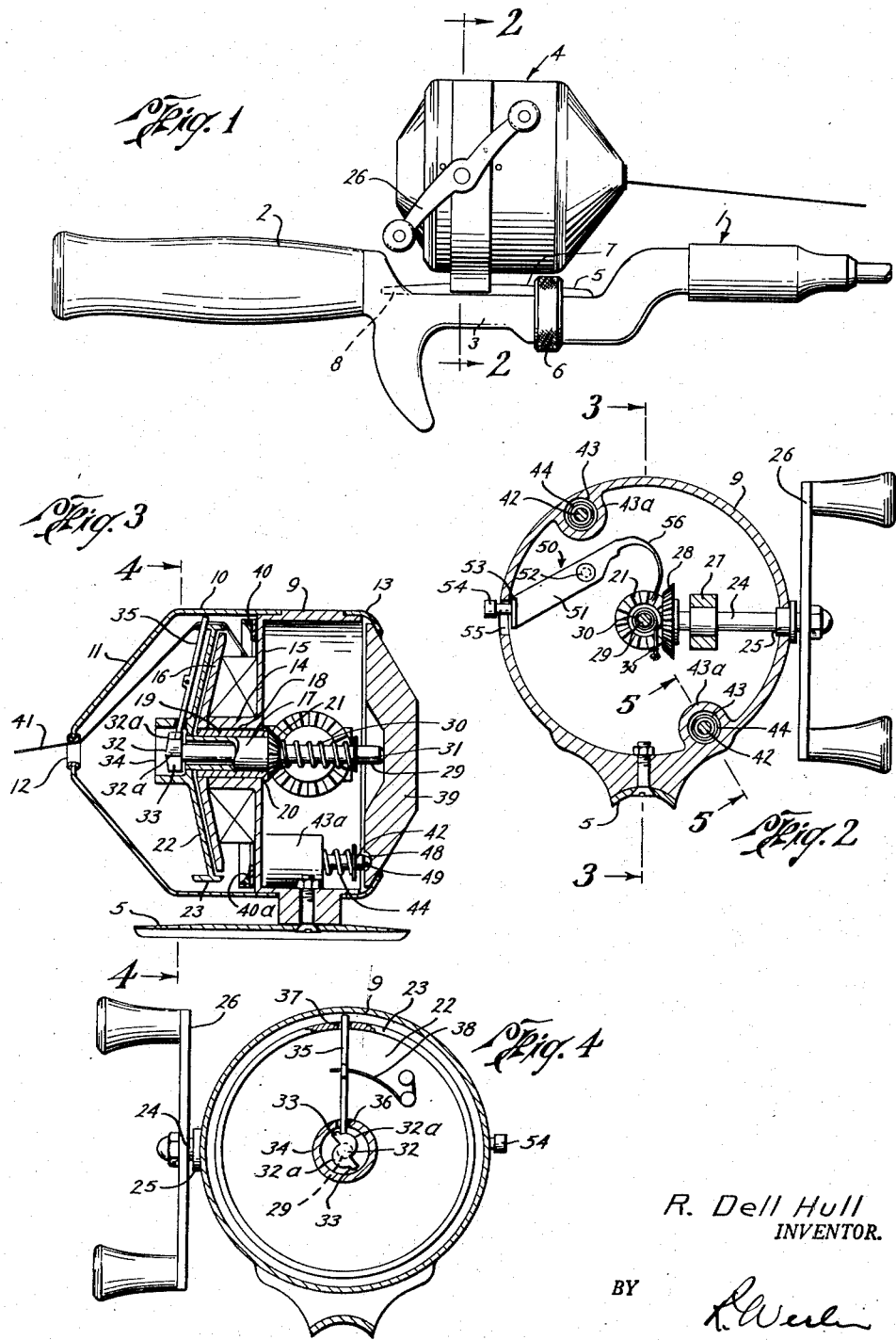

2,675,192

UNITED STATES PATENT OFFICE 2,675,192

SPINNING-TYPE REEL

R. Dell Hull, Tulsa, Okla.

Application April 5, 1951, Serial No. 219,345

12 Claims. (Cl. 242—84.5)

This invention relates to fishing reels and more particularly to devices of the so-called "spinning reel" type.

In such devices, the spool on which the line is wound remains stationary during casting and re-winding. Rewinding is ordinarily accomplished by means of a rotatable finger or pick-up member which guides the line on the spool. Prior devices have employed various arrangements for projecting and retracting the pick-up member into line engaging and disengaging positions which have proven relatively cumbersome and complicated. Moreover, such prior devices have either lacked suitable braking mechanisms for controlling the line during casting, or for playing a fish, or have employed mechanisms which have proven to be relatively inefficient or impractical.

The improved construction in accordance with the present invention employs a rotatable pick-up member which is located at the front of the line spool and has a radially projectable finger member operated by thumb pressure of the user.

A further feature of the present invention is the provision of a circular brake ring which is co-axial with the rotating pick-up member and resiliently movable to clamp the line against the pick-up member in order to effectively control the line during casting and in playing a fish, the movements employed to actuate this brake ring being those employed also to project and retract the line pick-up finger.

Further advantages of the construction are that no adjustments are necessary, and that the reel fits any conventional fishing rod and that it handles and is operated by the ordinary movements employed in handling and operating more conventional types of fishing reels. The danger of back-lash is completely eliminated and long, effortless cast, particularly of light lures, may be obtained.

Other and more specific objects and advantages of the present invention will become readily apparent from the following detailed description when read in conjunction with the accompanying drawings which illustrate one embodiment in accordance with this invention.

In the drawings:

Fig. 1 is an elevational view of the reel in position on a fishing rod;

Fig. 2 is a transverse, vertical cross-sectional view on line 2—2 of Fig. 1;

Fig. 3 is a longitudinal sectional view on line 3—3 of Fig. 2, showing the parts in positions occupied during re-winding;

Fig. 4 is a transverse cross-sectional view on line 4—4 of Fig. 3;

Fig. 5 is a detail taken generally on line 5—5 of Fig. 2;

Fig. 6 is a view similar to Fig. 3, showing the parts in the positions occupied while braking the line;

Fig. 7 is a view similar to Fig. 6, showing the parts of the reel in the positions occupied during casting; and Fig. 8 is a detail illustrating a modification of a portion of the structure.

Referring to the drawings, the reference numeral 1 designates generally a fishing rod of any desired and generally conventional construction. This rod is provided with a handle portion 2 and is further provided with a reel-receiving portion 3 which is flattened on its upper side. The reel, designated generally by the numeral 4, is mounted on a supporting plate 5 adapted to be secured to the reel-receiving portion of the handle, as shown. A securing ring 6 is arranged on the reel-receiving portion of the rod and is adapted to slide over one end of plate 5, which is upwardly tapered, as at 7, to wedgingly clamp the plate to the reel-receiving portion. In the construction shown, where the reel-receiving portion of the rod merges with the handle portion, there is provided a slot 8 for the reception of the opposite end of supporting plate 5.

Reel 4 comprises a tubular casing 9 formed of any suitable material and provided with a front cover 10 which fits snugly over the forward end of casing 9 and may be removed when desired. The forward portion of cover 10 is formed with a forwardly tapering conical portion 11 provided at its apex with a line guide opening 12. A ring shaped retainer 13 is removably mounted on the rearward end of casing 9, the inner periphery of retainer 13 being inwardly and rearwardly curved, as illustrated. A line spool 14 is positioned forwardly of casing 9 having its inner flange 15 fixedly connected to casing 9 and forming the forward wall of the casing. Spool 14 has a circular front flange 16 axially spaced from rear flange 15 and tapering slightly inwardly toward the latter, thereby having a forwardly projecting general conic form, as shown. A tubular shaft 17 extends axially through bore 18 of the spool and an anti-friction bearing 19 is interposed between shaft 17 and bore 18. The inner end of bearing 19 may be provided with an annular flange 20 which bears against the inner face of wall 15 to prevent the bearing from slipping outwardly through spool 14. The inner end of shaft 17 carries a pinion 21 which is fixedly mounted on the shaft and bears against the outer face of bearing flange 20. The outer end of shaft 17 extends slightly in front of the forward end of spool 14 and has rigidly mounted thereon a disk 22 which is of a shape generally complementary to the front face of flange 16 and is spaced slightly therefrom to provide a sufficient degree of clearance to permit disk 22 to rotate freely relative to the spool. The outer periphery of disk 22 carries a T-shaped flange 23, the inner end of which extends over and closely adjacent the outer periphery of spool flange 16 and, if desired, may extend rearwardly to a position over the mid-portion of spool 14. The outer end of flange 23 extends forwardly from the outer face of disk 22, forming a rim about the outer periphery of disk 22. The outer surface of flange 23 is preferably rounded at its ends, as shown. A crank shaft 24 is mounted in casing 9 at right angles to its longitudinal axis and projects radially through the wall of casing 9 through a bearing 25, and has mounted on its outer end a winding handle 26. The inner portion of crank shaft 24 is journalled in a support bearing 27, which is attached to wall 15 of the casing. Crank shaft 24 carries on its inner end a pinion 28, which is in mesh with pinion 21, whereby rotation of crank shaft 24 will rotate shaft 17 and disk 22. A cylindrical rod 29 extends slidably through the bore of shaft 17 and through the center of pinion 21 and projects rearwardly therefrom. A coil spring 30 surrounds the rearward projecting portion of rod 29 and is held in compression thereon between flange 15 and a lock-washer 31 mounted on rod 29, whereby to normally urge the rod in the rearward direction. The forward end of rod 29 extends slidably through disk 22 and has mounted on the outer end thereof a cam 32 having radially oppositely extending cam arms 32a—32a, which at their outer ends, have oppositely facing shoulders 33—33. (See Fig. 4 particularly). The inner ends of the cam arms may be faired into the cylindrical surface of rod 29. A tubular boss 34 projects forwardly from the center of disk 22 and surrounds cam 32. A pin 35 is mounted for radially sliding movement on the outer face of disk 22, the inner end of the pin extending through and opening 36 in the wall of boss 34 into engagement with cam 32, and the upper end extending through an opening 37 in the outer end of flange 23. A spring arm 38 has one end attached to disk 22 and the other connected to pin 35 and is arranged to normally urge pin 35 inwardly toward cam 32. With the cam and pin arrangement described, it will be seen that when rod 29 is moved forwardly relative to disk 22, cam 32 will also move forwardly in front of the inner end of pin 35, allowing pin 35 to move inwardly behind cam 32 toward the surface of rod 29, thereby retracting the pin inside the periphery of flange 23, as illustrated particularly in Figs. 6 and 7. On the other hand, when rod 29 is retracted, slight relative rotation between rod 29 and disk 22 will cause pin 32 to ride up on arms 32a and engage shoulder 33, whereby to force the pin outwardly to a position in which the outer end of the pin will project beyond the periphery of flange 23, as illustrated particularly in Fig. 4, the inner end of pin 35 engaging shoulder 33 at the outer end of its travel. Also, it will be noted that the only connection between disk 22 and rod 29 is that formed by pin 35 when it is engaged against shoulders 33 of cam 32. The functioning of these elements will be described in greater detail hereinafter.

A dome-shaped pressure plate 39, which serves as a rear cover for casing 9, is loosely mounted in the rear portion of casing 9, being held against outward movement from the casing by the inwardly curved periphery of retainer 13. A ring-shaped brake member 40 is mounted in front of flange 15 and is provided with a lining 40a composed of any suitable friction creating material, such as rubber, plastic, or other composition material. Brake member 40 is radially and annularly dimensioned so that when moved forwardly, it will annularly engage the inner edge of flange 23 which projects over the edge of flange 16 and thereby clamp or brake the movements of a line 41, which is wound on spool 14 and feeds to and from the spool over the surface of flange 23. A plurality of circumferentially spaced brake rods 42 project rearwardly of brake member 40 and extend through suitable registering guide channels 43—43 provided in bosses 43a mounted on the wall of casing 9. Coil springs 44 surround each of the brake rods 42 and are held in compression between suitable abutments 46 (Fig. 5) inside guide channels 43 and lock rings 47 mounted on the outer ends of brake rods 42. These springs tend to urge brake member 40 rearwardly away from flange 23. The outer ends of rods 42 may be rounded, as at 49, and extend into rounded depressions 48 provided in pressure plate 39.

The reel may also be provided with a click mechanism of any suitable construction. In the particular form illustrated the click mechanism is formed of a single piece 50 of flat spring steel (see Fig. 2). The intermediate portion 51 is arranged to lie flat against the face of wall 15 and is pivoted thereon by means of a pivot pin 52. The end portion 53 is bent at right angles to the intermediate portion to lie parallel to the wall of casing 9 and is provided with a thumb button 54 extending through an opening 55 to the exterior of the casing. The opposite end 56 of the strip is narrowed and twisted at right angles to the plane of the intermediate portion forming a flexible finger which extends toward the teeth of pinion 21. The click device is shown in Fig. 2 in the operative position. By moving button 54 downwardly, the device is swung on pivot 52 to bring end 56 out of engagement with the teeth of pinion 21.

The above-described reel operates in the following manner: It will be assumed that a rewinding operation has just been completed. At this stage the parts of the reel will be in the positions shown in Fig. 3, in which it will be noted that pin 35 is riding on the outer end of one of the cam arms 32a and is projecting through flange 23 into engagement with line 41, and that brake member 40 and pressure plate 39 are in their rearwardly retracted positions under the urging of springs 44.

To prepare the reel for casting, the operator presses forwardly on the outer face of pressure plate 39. This forward movement of pressure plate 39 urges brake member 40 against the inner edge of flange 23 and clamps line 41 between flange 23 and brake member 40 thereby temporarily preventing the line from feeding off of spool 14. The inward movement of pressure plate 39 also engages the end of rod 29 and urges it forwardly against the resistance of spring 30, moving cam 32 forwardly relative to pin 35 so that the latter will be retracted under the urging of spring 38, its inner end resting on rod 29 and its outer end retracting into opening 37 to a position flush with, or slightly inside, the outer periphery of flange 23. At this position the inner end of pin 35 resting on rod 29 will be behind cam 32 and will prevent rearward movement of rod 29 during casting. These positions are shown particularly in Fig. 6. At this instant brake member 40 will still remain in engagement with line 41 and prevent its feeding off the spool. As the cast is made, the thumb pressure will be relieved from pressure plate 39 allowing brake member 40 to retract to the position shown in Fig. 7, thereby releasing line 41 which will unwind from spool 14 in response to the outward flight of the lure attached to the line. Disk 22 will remain stationary while the line is feeding out. Pin 35 will remain in the retracted position during the cast and the length of cast and the movement of the line from the spool may be controlled by "thumbing" pressure plate 39 to thereby brake the line between flange 23 and brake member 40, as desired, the movements being closely similar to the movements employed in controlling the cast from a more conventional reel.

When it is desired to rewind the line, pressure plate 39 will be allowed to return to its normally retracted position and the operator simply begins turning handle 26 to rotate shaft 24' and pinion 28 in the re-winding direction. The engagement of the latter with pinion 21, which is fixed to shaft 17, will rotate the pinion and disk 22 which is fixedly connected to shaft 17. Rotation of disk 22 will be transmitted to pin 35 until the inner end of pin 35 is opposite the center of cam 32, at which point pin 35 will then ride up off of rod 29 on to the inner end one of the arms 32a of cam 32. When the end of pin 35 starts up on the cam, rod 29 will retract under the rearward urging of spring 30, since the inner end of pin 35 has now moved out of the path of rearward movement of cam 32. When the inner end of pin 35 has moved outwardly over the face of cam arm 32a, the outer end of the pin will again project outwardly from the periphery of flange 23 and engage line 41. When the inner end of pin 35 comes up against the shoulder 33, disk 22 will be locked to rod 29. It will be understood that all of these movements will occur during the first small fractional part of the rotation of handle 26. Thereafter, continued rotation of the handle will rotate disk 22 and the projecting pin 35 and the latter will catch line 41 and wind it on spool 14 as the disk rotates, the rotation of the handle being continued until the line is re-wound to the desired degree, at which instant the parts of the reel will again be in the positions illustrated in Fig. 3 and ready to begin another series of casting operations as previously described.

Fig. 8 illustrates a modification in which pressure plate 39 is hinged at one point to casing 9, as by means of a small plate-type hinge 57. With this arrangement the braking pressure may be somewhat better equalized on brake member 40, irrespective of the particular area of plate 39 to which the thumb pressure of the caster may be applied.

It will be apparent from the foregoing description that I have provided a device of the "spinning reel" type which has many advantages over such prior devices. While I have shown and described a preferred form of the invention, it is, of course, understood that modifications therein, within the scope of the appended claims, may be made without departing from the spirit of the invention.

What I claim and desire to secure by Letters Patent is:

1. A spinning type reel, comprising, a tubular casing, a line-carrying spool non-rotatably mounted in the casing, a line pick-up disk rotatably mounted in front of the spool and having an annular peripheral portion extending radially beyond the periphery of the spool, an annular brake member mounted in the casing and surrounding the spool and axially reciprocable relative to said annular portion for braking a line in passage over said annular portion, and means for rotating said disk.

2. A spinning type reel, comprising, a tubular casing, a line-carrying spool non-rotatably mounted in the casing, a line pick-up disk rotatably mounted in front of said spool and having an annular peripheral portion extending radially beyond the periphery of the spool, an annular brake member mounted in the casing and surrounding the spool and axially reciprocable relative to said annular portion for braking a line in passage over said annular portion, brake-actuating means resiliently connected to said brake member for urging said brake member toward said annular portion, and means for rotating said disk.

3. A spinning type reel, comprising, a tubular casing, a line-carrying spool non-rotatably mounted in the casing, a line pick-up disk mounted in front of said spool and having an annular peripheral portion extending radially beyond the periphery of the spool, a line pick-up finger mounted on said disk for rotation therewith and radially projectible from the periphery thereof in response to rotation of the disk in one direction to engage a line in passage over said annular peripheral portion, an annular brake member mounted in the casing and surrounding the spool and axially reciprocable relative to said annular portion for braking the line in passage over said annular portion, and means for rotating said disk.

4. In a spinning type reel according to claim 3, brake-actuating means resiliently connected to said brake member for urging said brake member toward said annular portion.

5. A spinning type reel, comprising, a tubular casing, a line-carrying spool non-rotatably mounted in the casing, a rotatable tubular shaft extending axially through said spool, a pick-up disk fixedly mounted on the shaft in front of the spool and having an annular peripheral portion extending radially beyond the periphery of the spool, a line pick-up finger mounted on said disk for rotation therewith and radially projectible from the periphery thereof to engage a line in passage over said annular peripheral portion, cam means mounted in said shaft and axially slidable into and out of engagement with the inner end of said finger and shaped to radially project said finger in response to relative rotation of said disk in one direction, resilient means normally urging said cam means to the finger-engaging position, a cam actuating member releasably engageable with the cam means for urging said cam means to the finger-releasing position, and means for rotating said shaft.

6. In a spinning type reel according to claim 5, an annular brake member mounted in the casing and surrounding the spool and axially reciprocable relative to said annular portion for braking the line in passage over said annular portion.

7. In a spinning type reel according to claim 5, an annular brake member mounted in the casing and surrounding the spool and axially reciprocable relative to said annular portion for braking the line in passage over said annular portion, and a brake-actuating member resiliently connected to said brake member for urging said brake member toward said annular portion.

8. In a spinning type reel according to claim 5, an annular brake member mounted in the casing and surrounding the spool and axially reciprocable relative to said annular portion for braking the line in passage over said annular portion, and a brake-actuating member resiliently connected to said brake member for urging said brake member toward said annular portion, said brake-actuating member and said cam-actuating member comprising a single plate element reciprocably disposed in said casing behind said spool.

9. A spinning type reel comprising a tubular casing, a line-carrying spool non-rotatably mounted in the casing, a rotatable tubular shaft extending axially through said spool, a line pick-up support member fixedly mounted on the shaft in front of the spool, a line pick-up finger mounted on said pick-up support member for rotation therewith and radially projectible from the outer end thereof to engage a line in passage from the spool, cam means mounted in said shaft and axially slidable into and out of engagement with the inner end of said line pick-up finger and shaped to radially project said finger in response to rotation of said pick-up support member, a cam actuating member releasably engageable with the cam means for urging said cam means to the finger-releasing position, and means for rotating said shaft.

10. A spinning type reel according to claim 9 which includes resilient means normally urging said cam means to the finger-engaging position.

11. A spinning type reel comprising a tubular casing, a line-carrying spool non-rotatably mounted in the casing, said spool having a front flange over which line passes to and from the spool, a line pick-up member rotatably mounted in front of the front flange of the spool, an annular brake member mounted in the casing and surrounding the spool and being axially movable relative to the spool to brake a line in passage over said front flange of the spool, brake-actuating means connected to the brake member for urging said brake member forwardly in the casing, and means for rotating said line pick-up member.

12. A spinning type reel comprising a tubular casing, a line-carrying spool non-rotatably mounted in the casing, said spool having a front flange over which line passes to and from the spool, a line pick-up member rotatably mounted in front of the front flange of the spool, a brake member mounted in the casing rearwardly of the front flange of the spool and axially movable relative to the spool for pressing the line against a surface over which the line passes from the spool in passage over said front flange of the spool, brake-actuating means located rearwardly of the spool for moving said brake member to braking position, and means for rotating said line pick-up member.

References Cited in the file of this patent

UNITED STATES PATENTS

| Number | Name | Date |
| --- | --- | --- |
| 1,150,575 | Blodgett | Aug. 17, 1915 |
| 1,187,840 | Illingworth | June 20, 1916 |
| 2,492,587 | Ledingham | Dec. 27, 1949 |
| 2,507,457 | Rix | May 9, 1950 |
| 2,521,543 | Shakespeare et al. | Sept. 5, 1950 |
| 2,537,613 | Allen | Jan. 9, 1951 |

FOREIGN PATENTS

| Number | Country | Date |
| --- | --- | --- |
| 904,699 | France | Mar. 12, 1945 |
| 938,912 | France | Apr. 12, 1948 |